United States Patent [19]

Rodriguez et al.

[11] Patent Number: 4,907,911
[45] Date of Patent: Mar. 13, 1990

[54] PIPELINE RENOVATION SYSTEM

[75] Inventors: Alan Rodriguez, Gressingham; John A. Rose, Giggleswick; Clifford B. Waller; Anthony W. Doyle, both of Reading, all of England

[73] Assignees: Angus Fire Armour Limited, Lancaster, United Kingdom; Thames Water Authority, Reading, United Kingdom

[21] Appl. No.: 187,036

[22] Filed: Apr. 27, 1988

[30] Foreign Application Priority Data

Apr. 27, 1987 [GB] United Kingdom ................. 8709933
Aug. 19, 1987 [GB] United Kingdom ................. 8719537
Aug. 19, 1987 [GB] United Kingdom ................. 8719536

[51] Int. Cl.[4] .............................................. F16L 1/00
[52] U.S. Cl. ...................................... 405/154; 138/97; 138/98; 405/146; 285/189
[58] Field of Search ........................ 405/154, 156, 157; 138/97, 98; 156/287; 285/189, 193, 200, 208, 209, 210; 264/269; 29/402.14, 525; 411/535, 536, 539, 541

[56] References Cited

U.S. PATENT DOCUMENTS

| | | | |
|---|---|---|---|
| 1,452,492 | 4/1923 | Carpenter | 411/539 X |
| 2,608,501 | 8/1952 | Kimble | 285/363 |
| 3,033,514 | 5/1962 | Grosch | 285/209 X |
| 3,650,551 | 3/1972 | Akers | 285/200 X |
| 3,927,695 | 12/1975 | Crockwell | 138/137 |
| 4,009,063 | 2/1977 | Wood | 264/269 X |
| 4,091,063 | 5/1978 | Logan | 138/134 |
| 4,241,763 | 12/1980 | Antal et al. | 138/127 |
| 4,564,222 | 1/1986 | Loker et al. | 29/525 X |
| 4,686,126 | 8/1987 | Hyodo et al. | 138/97 |

FOREIGN PATENT DOCUMENTS

| | | | |
|---|---|---|---|
| 566954 | 1/1945 | United Kingdom | 285/200 |
| 2097892 | 11/1982 | United Kingdom | 138/97 |

Primary Examiner—Randolph A. Reese
Assistant Examiner—Arlen L. Olsen
Attorney, Agent, or Firm—Wenderoth, Lind & Ponack

[57] ABSTRACT

A method of lining an existing pipe by pulling through it a collapsible, flexible, lay-flat liner having an innermost layer of impervious, elastomeric material which is compatible with the fluid to be carried by the pipe, a textile reinforcing intermediate layer, and an external protective layer of elastomeric material. The liner has an external circumference slightly less than the internal circumference of the pipe and is such that flow of fluid through the liner after the installation thereof expands the liner into non-binding contact with the internal surface of the pipe. The peripheral extension (diametral swell) of the liner at the intended working pressure of the relined pipe should be less than 10% and preferably less than 5%.

9 Claims, 6 Drawing Sheets

PIPELINE RENOVATION SYSTEM

BACKGROUND OF THE INVENTION

This invention relates to the renovation of mains supply systems comprising supply pipes for the distribution of water, gas or fluids and has a particularly useful but not exclusive application to underground mains. Generally the systems comprise main delivery pipes, which are connected to the fluid supply, and a plurality of branchpipes or laterals which tap off the fluid supply to the final users.

A major problem arises when such underground pipes have deteriorated, for example through corrosion, ageing or other damage. Repairs by methods requiring the digging of trenches along the whole length of the pipeline disrupt road traffic, and potentially expose adjacent underground supplies by cable, pipe or other means to damage during the digging operations. These factors give rise to high maintenance costs for underground pipelines.

Various alternative methods are now being used to rehabilitate such existing mains, for example, by spraying materials which solidify as a lining in at least part of the existing pipe, thereby sealing leaks therein and prolonging the life of the mains pipes for many years. Other methods involve relining the pipes with plastics or rubber lining materials which may be bonded to the internal wall surface of the original pipe. Processes have also been proposed in which lining materials consisting of a textile tube coated with plastic materials are everted into pipes and bonded to the pipe walls by rigidifying epoxy resins. In these last-mentioned processes, it is necessary carefully to clean out debris from the pipe in order to ensure good adhesion between the lining and the original pipe. Furthermore, the reinforcement used must allow swell and dilation of the liner during insertion and eversion, in order that the liner can conform and adhere to the pipe wall surface, which requires that the liner itself be of fairly low bursting pressure. A further problem with this system is that the existing pipelines frequently have obtrusions in the wall, for example, where a redundant lateral pipe extends through the pipe wall, and these obtrusions frequently have sharp edges, which can cut through the liner when the system is pressurised with fluid during lining insertion or subsequent use. These necessitate careful cleaning and preparation of the internal surface of the pipe before inserting the new liner.

BRIEF SUMMARY OF THE INVENTION

According to the present invention there is provided a method of lining an existing pipe comprising pulling through it a collapsible, flexible, lay-flat, tubular liner having an innermost layer of impervious, elastomeric material which is compatible with the fluid to be carried by the pipe, a textile reinforcing intermediate layer, and an external protective layer of elastomeric material, the said liner having an external circumference slightly less than the internal circumference of the pipe and being such that pressure of said fluid in the liner after the installation thereof expands the liner into non-bonding contact with the internal surface of the pipe.

It is desirable that the circumferential extension (diametral swell) of the liner at the intended working pressure of the re-lined pipe should be less than 10% and preferably less than 5%.

BRIEF DESCRIPTION OF THE DRAWINGS

The invention will now be described in more detail with reference by way of example to the accompanying diagramatic drawings in which.

DETAILED DESCRIPTION OF THE INVENTION

Figure 1A:
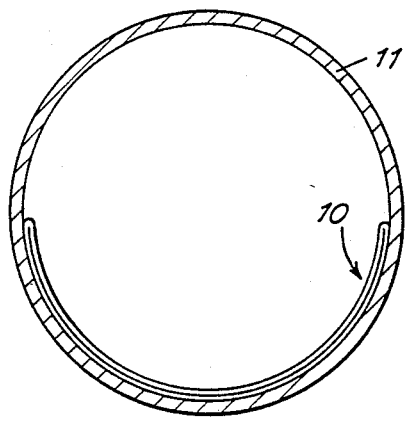
FIG. 1A illustrates a cross-section of a pipeline in which a liner has been installed by a method according to the invention, and shows the arrangement prior to the commencement of fluid flow through the liner.

Referring to FIG. 1, the liner 10 is a lay-flat liner and is hauled in its flattened condition through the length of mains pipe 11 to be lined as shown by FIG. 1A. When the ends of the liner have been secured to the ends of the mains pipe in a manner described herein and a flow of the fluid is passed along the lined main pipe at substantially atmospheric pressure the liner expands first to its normal diameter as shown in FIG. 2A, which is less than the internal diameter of the mains pipe, and as the fluid pressure increases to its working value, the liner expands diametrally into non-bonding contact with the internal surface of the mains pipe as shown in FIG. 2B. This expansion of the liner beyond its normal diameter should not exceed 10% and should preferably be less than 5% of its unexpanded diameter.

Figure 1B:
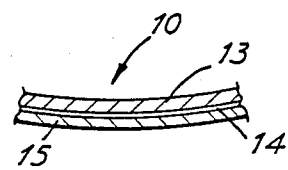
FIG. 1B is a fragmentary cross-sectional view of the liner.
Figure 2A:
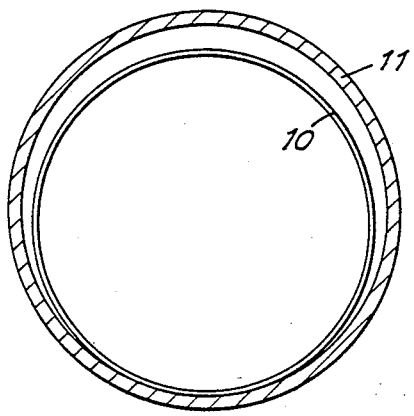
FIG. 2A shows the arrangement of FIG. 1 showing the liner expanded under low gauge pressure only.
Figure 2B:
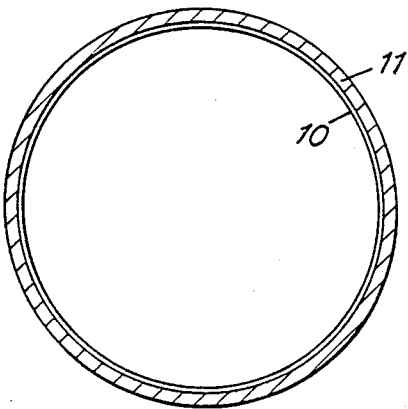
FIG. 2B shows the liner expanded by the fluid flow under working pressure.

As shown in FIG. 1B, the liner comprises an innermost layer 13 of impervious elastomeric material which is compatible with the fluid to be carried by the mains pipe, a textile reinforcing layer 14 surrounding the layer 13, and an external protective layer 15 of elastomeric material.

In order that the re-lining method of the invention may meet the short and long-term conditions of fabrication and end-use to best advantage, the choice of materials and design of the liner is required to meet many conditions.

The elastomer from which the innermost layer 13 is made is selected from materials which are chemically and microbiologically inert to the fluid to be carried, and likewise, must not contaminate the fluid. For the distribution of drinking water, contamination by chemical materials, such as polymer impurities, catalysts, stabilizers, colourants and other additives which might be extracted into the water stream is unacceptable, and materials may only be used for this purpose after full chemical and microbiological testing and the issue of approvals by Testing and Approval laboratories in the country or area concerned. Similarly, the retention of elastomeric, tensile and physical properties throughout long exposure to the fluids is vital. We have found that elastomeric polyether polyurethanes meet these requirements, but alternatives can be obviously found by those skilled in the art.

The textile reinforcing layer 14 in the liner is designed to provide mechanical strength required during its insertion into the pipe and during its long-term use. This may be included in the construction by braiding, laying yarns, knitting or by weaving. We have found that circular woven reinforcements are particularly applicable to the product and process.

The textile reinforced liners which are used in the present methods are able to support internal fluid pressures customarily used, even without the structural support of the pipe of which they form the lining.

The covering layer 15 of elastomeric material protects the textile reinforcement from abrasion during insertion and use. Thus, if protrusions, for example of redundant lateral branch connections, exist in the original pipe, we have found that the liner is not burst or broken by the stress concentration at the sharp edges of such protrusions. This often enables the pipe to be lined with the unattached liner without the need for and expense of internal scraping and flattening such protrusions, by the use of pigs, moles or other suitable means, before the lining operation itself.

A further advantage of the present method is that in the event of eventual failure of a section of lined pipe, the liner can be hauled out and replaced, in contrast to systems in which the liner is adhered to the original pipe wall and made rigid by, for example, thermosetting resins.

The liner can be made in lengths of 200m or more and, in contrast to known methods, is inserted in its operational state without the need to activate adhesives or to cure the material of the liner.

Since the thickness of the liner is negligible compared with its diameter, and its interior, being smooth, gives low frictional resistance to fluid flow, the lined pipe has similar fluid-carrying performance to the original main.

Pipes lined by methods according to the invention are also advantageous in that failure of the existing pipe through crushing or bending by earth movements need not cause failure, since the liner is flexible and may be capable of itself containing the operating fluid pressure, even in absence of the original mains pipe.

In contrast to some other trenchless pipe laying methods, e.g. pipe breaking by moles, the present method can be employed without risk of damaging other underground utilities, such as gas, electricity or communications systems.

Figure 3:
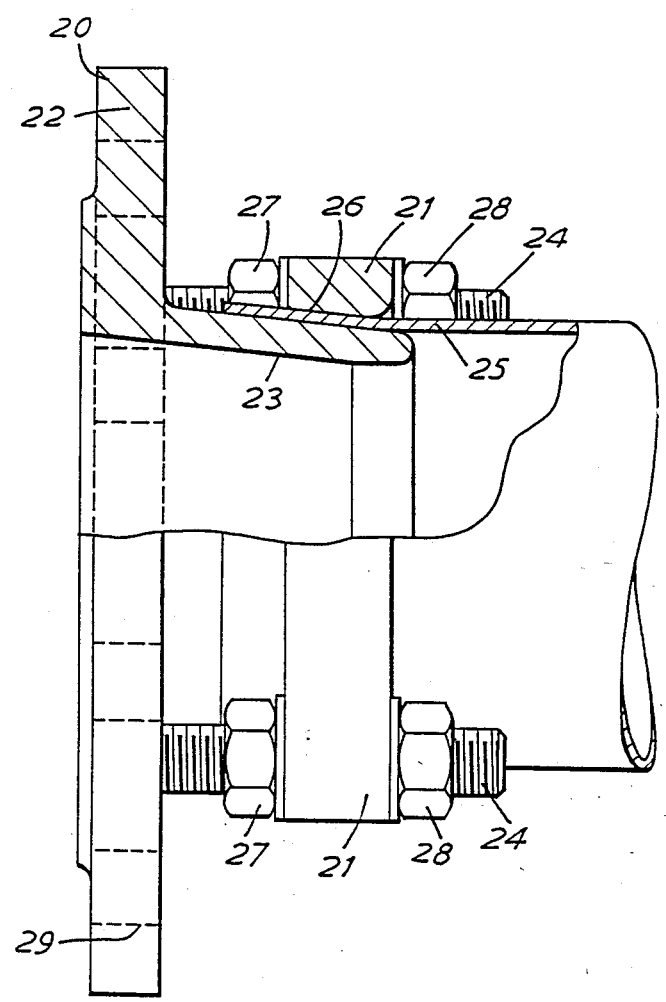
FIG. 3 is a part sectional side view showing the attachment of an end coupling to the lining.
Figure 4:
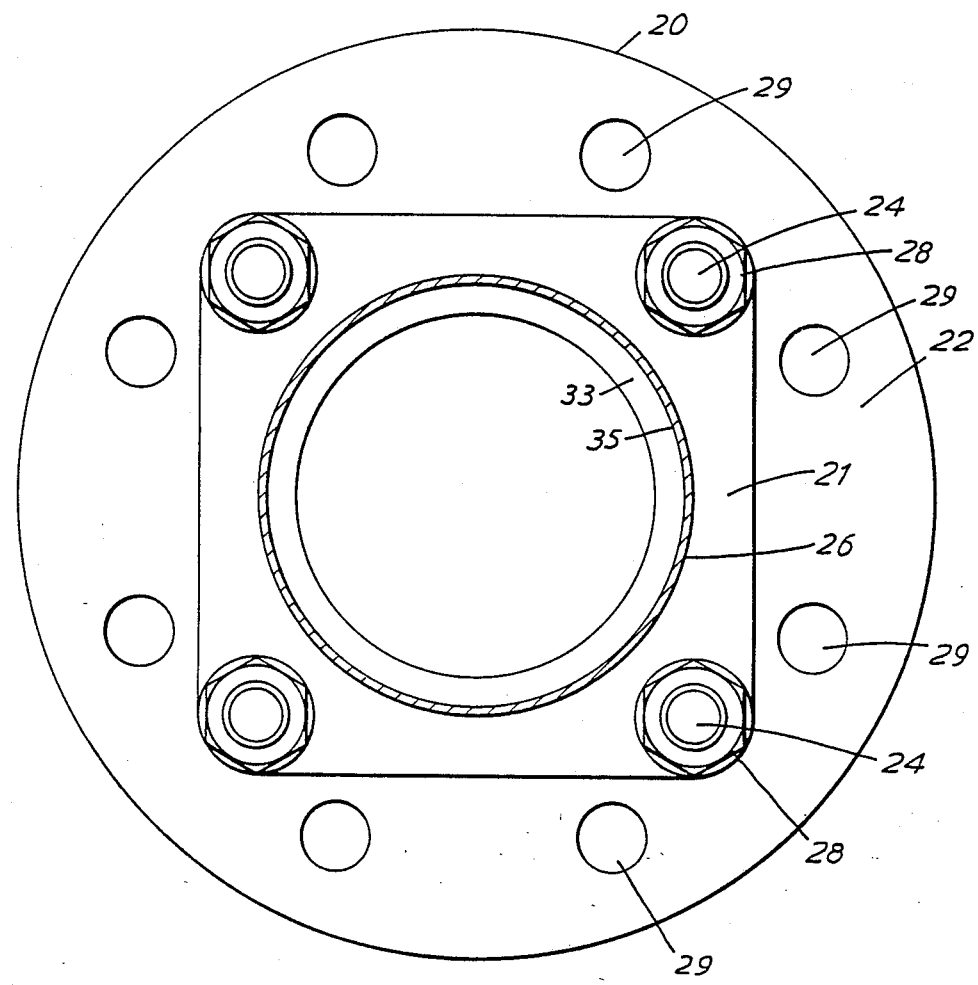
FIG. 4 is an end view of the arrangement shown in FIG. 3.

To enable the ends of the liner to be secured to the ends of lined sections of the mains pipe, the liner is arranged to project beyond each end of the pipe and has secured to each end a metal coupling as shown in FIGS. 3 and 4. In addition to providing an impervious seal, the coupling has fittings to enable it to be attached to valves or to other similar connectors which are similarly connected to the next section of mains pipe, or to a similarly lined section of such pipe.

The coupling comprises a first or inner member 20 and a second or outer member 21. The first member 20 is formed with a standard flange 22, a tubular portion 23 which tapers conically inwards away from the flange 22 and four threaded studs 24 extending axially with respect to the tubular portion 23. The second member 21 is externally square and has internally a conically tapered hole 26. The taper of the hole 26 is of the same angle as the taper of the tubular portion 23 of the first member. Member 21 has four holes for receiving the studs 24 and nuts 27, 28 are provided on each stud 24 at opposite sides of the second member 21.

In use, the second member is passed over the end of the liner 25 and the tubular portion 23 of the first member is pushed into the end of the liner. The second member is engaged on the studs and by selective tightening of the nuts 27, 28, the second member is moved axially with respect to the first member thereby to clamp the liner between the tapered tubular portion 23 and the tapered hole 26 of the second member. A seal is thus formed between the liner and the tubular portion.

Holes 29 are also provided in the flange 22 so that if it is required to support the coupling with tie rods, these may also serve as flange bolts and run past the coupling outer member 21 to another fitting. As shown in FIG. 4, holes 29 lie outside the periphery of the outer member 21.

End couplings described above are advantageous in that the coupling can be successfully achieved with minimal lining exposure, with minimum excavation and using small simple tools, rather than large specialised and expensive equipment which would have to be brought to the scene of the operation.

A pressure-tight seal is ensured by the high axial force produced by the four nuts, by the wedge action of the taper, by the restricted area of the outer part in contact with the liner and by the ability of the outer part to float thus ensuring an even pressure on the liner. This last feature is helped by clearance between the studs and the four holes in the outer part.

It will of course be appreciated that any desired number of studs 24/holes, and holes 29 in the flange 22 may be provided. Furthermore the central hole 26 in the second member is not necessarily tapered but could present a convexly curved profile viewed in cross-section.

When a mains pipe is relined and is required also to be provided with one or more lateral service branches, it is advantageous to provide a system for fitting service connections into a lined main pipe from the outside of the lined pipe, and without the need to introduce any components of the connection from the exposed ends of the liner and pipe, and an apparatus for this purpose is shown in FIGS. 5A to 8 to which attention is now directed.

Figure 5B:
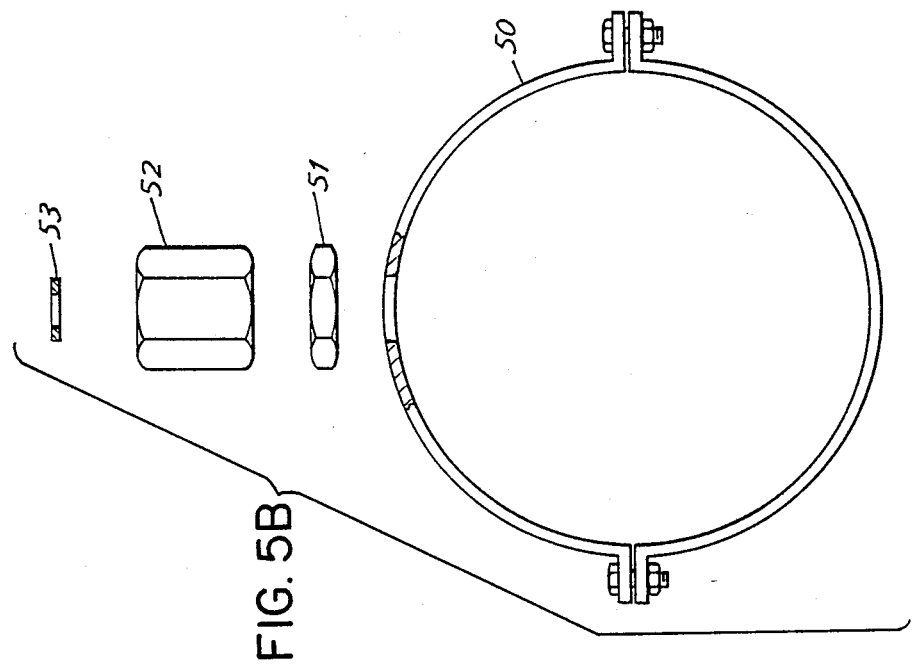
FIG. 5B is an exploded partsectional view of a further component of the device of FIG. 5A.
Figure 5A:
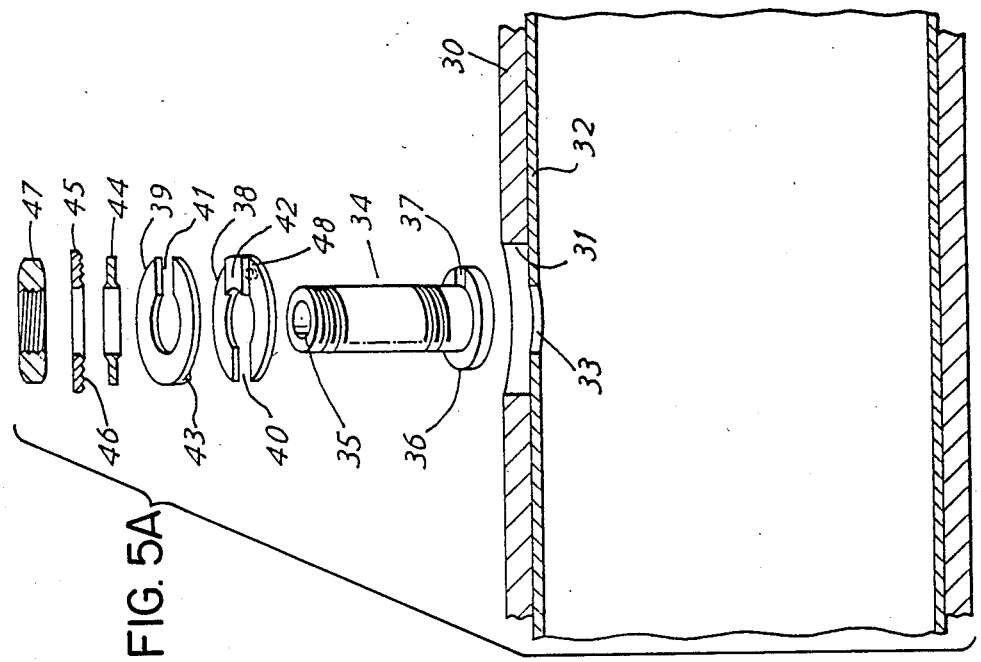
FIG. 5A is an exploded part side/part sectional view of the components of a device for connecting a branch pipe to the lined mains pipe.
Figure 6:
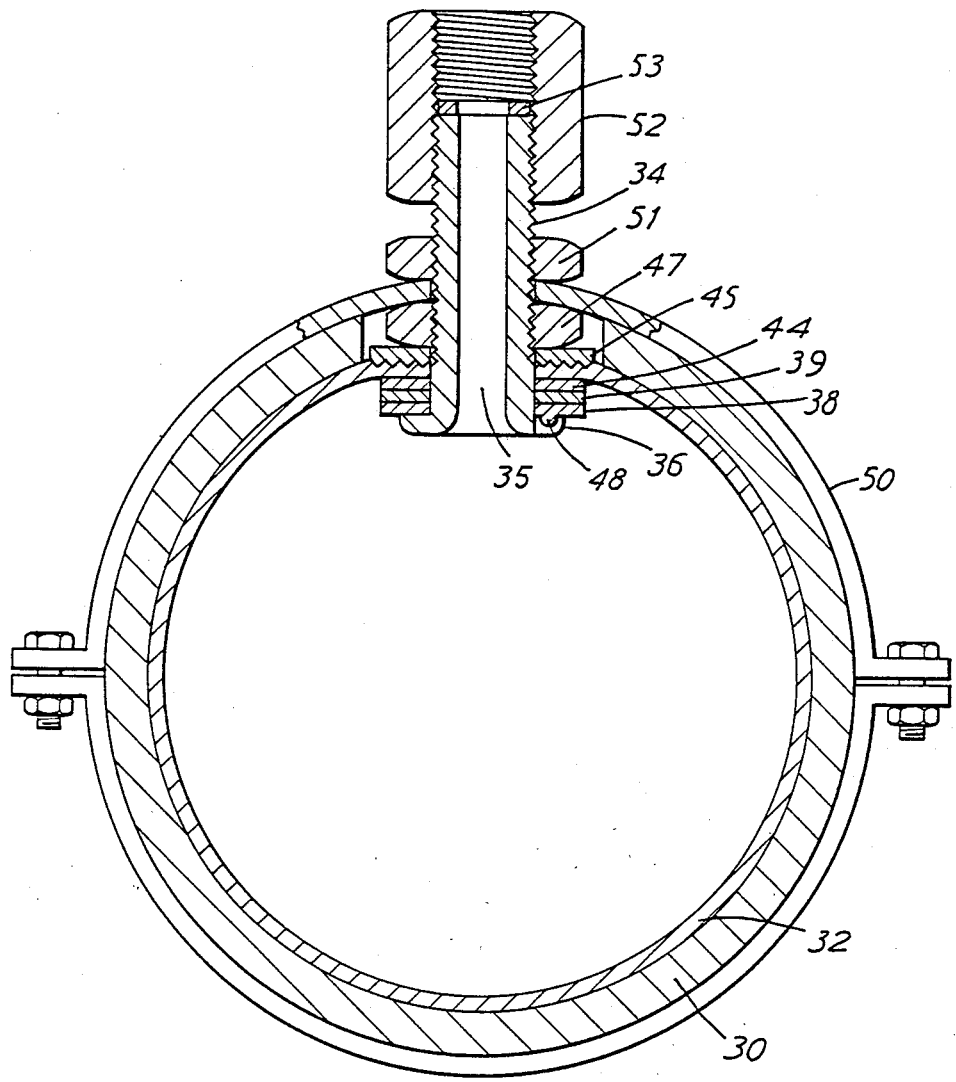
FIG. 6 is part side/part sectional view of the components shown in FIG. 5 in an assembled form.

FIGS. 5A, 5B and 6 show a mains pipe 30 having at intervals along its length a number of lateral openings 31 (only one of which is shown) for the introduction of, for example, branchpipes leading to respective houses or other points of utilisation.

The liner is first brought into engagement with the internal surface of the pipe by inflating with air and maintaining in the liner a gauge pressure of approximately 14 kPa (2 lb/sq.in.).

A hole 33 is then formed in the liner 32 at a place where there is an opening 31. The diameter of the hole 33 is smaller than the opening 31 and is conveniently but not necessarily approximately equal to the diameter of the associated branchpipe.

The lateral connection device or service connector for securing in the hole and opening comprises a hollow bolt 34 having an axial through bore 35 approximately equal to the diameter of the branchpipe. At one end the bolt has an annular shoulder 36 which is of greater diameter than the hole 33 but which can be pushed through the hole 33 in the liner because of the flexibility of the liner and because the shoulder has a recess 37 which is wider than the thickness of the liner 32 thereby facilitating insertion.

Once the hollow bolt has been inserted into the liner a pair of interlocking washers 38, 39 are inserted. Although their outside diameter is much greater than that of the hole 33, a gap 40, 41 in each washer allows them to be passed through the hole 33. Each washer has a protrusion 42, 43 shaped to fit the gap in the other washer so that the two washers together present a substantially unbroken support surface to an elastomeric sealing washer 44 and also a substantially unbroken face to the shoulder 36 of the bolt. The elastomeric sealing washer 44 is soft enough to allow it to be passed through the hole 33. This washer in use seals against the inner surface of the liner and also against the outside surface of the bolt 34. To ensure the second requirement the washer is preferably made thicker in the centre so that when the washer is axially compressed the excess material is forced against the bolt to make a seal. An external washer 45 has teeth 46 to improve the clamping of the liner in the connection device. A nut 47 is engaged on the bolt to hold the assembly together and when tightened, the nut provides the axial force to create the seals.

To facilitate the assembly of this connection device in the pipe, a piece of thick flexible cable may be fitted to the hollow bolt. An internal thread may be provided in the bolt for this purpose. By means of this cable, the bolt may be pushed right through the hole 33 and the interlocking washers inserted without any danger of losing either the hollow bolt, the interlocking washers or the sealing washer in the pipe. To facilitate the meshing of the interlocking washers, a small protrusion, 48, may be provided on the underside of the washer 38 so that, if the hollow bolt is rotated by hand, the protrusion engages the recess 37 in the hollow bolt 34. Further rotation of the hollow bolt, now also turning the washer 38 causes the washer 39 to lock onto the washer 38. After the external washer and nut are fitted, the flexible cable is removed.

The above description shows how the service connector is fastened to the liner. To provide rigidity with respect to the pipe 30, an external saddle strap 50 may be fitted over the hollow bolt and tightened securely to the pipe. A locking nut 51 is tightened onto the saddle strap which makes the whole assembly adequately rigid. A standard service fitting having an external thread equal in size to the thread on the hollow bolt is used between the connector and the supply pipe to the house or other point of utilisation. A long nut 52 is used between the standard service fitting and the hollow bolt and a hard elastomeric or soft metal washer 53 is used to seal between the two components.

In some applications it may be satisfactory to use flat components in contact with the liner and thus flatten the liner where it is clamped by the fitting. For other applications the washer 39 may be cylindrically curved on its top surface to match the curvature of the liner and the external washer may be similarly curved for cooperation therewith. Means may be provided to ensure that the axis of curvature of these items is held parallel to the axis of the pipe while the nut 47 is tightened.

Figure 8:
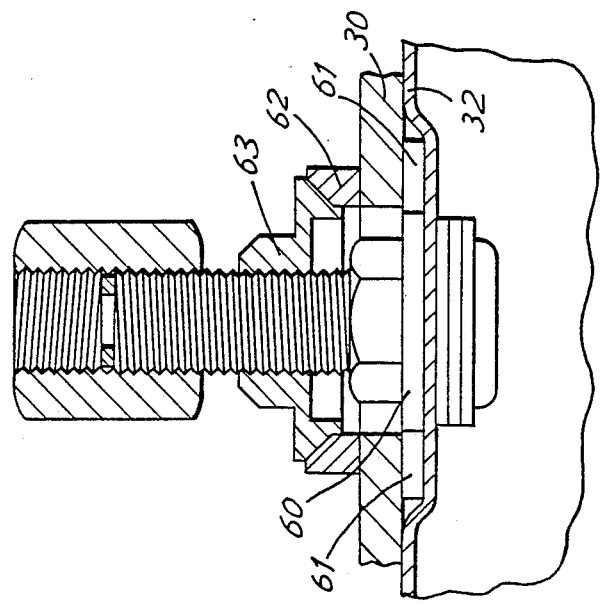
FIG. 8 is a sectional view corresponding to FIG. 7.
Figure 7:
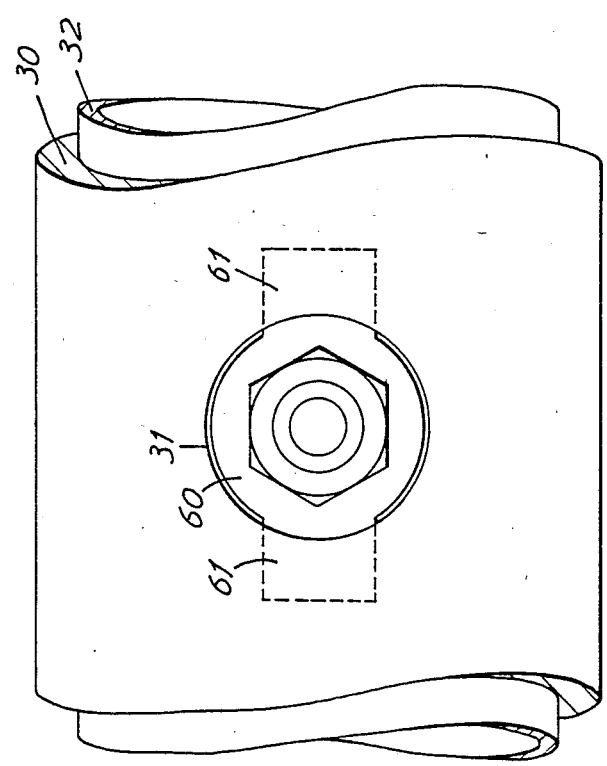
FIG. 7 is a plan view of an alternative form device for connecting a branch pipe to the lined mains pipe.

To give the service connector rigidity with respect to the pipe 30, there are alternatives to the saddle. One alternative is shown in FIGS. 7 and 8. The external washer 45 is replaced with a washer 60 which is similar except for two projections 61. By depressing the liner in the pipe, the washer may be introduced through the hole 31 and the assembly procedure continued as before. Instead of the saddle 50 and nut 51, a tubular saddle 62 and a combined nut and washer 63 operate together to pull the hollow bolt upwards thus bracing the elongate washer 60 firmly agianst the pipe 30 on both sides of the opening in the pipe thus providing the required rigidity with respect to the pipe.

In cases where the pipe is in reasonable mechanical condition, this system is preferable. Where the pipe is cracked or corroded this system may make excessive demands on the strength of the pipe, and the saddle is then preferred, and in extreme cases may cover a considerable length of the pipe.

The interlocking washers 38 and 39 are only one example of a solution to the problem of inserting a large washer through a small hole. One can for example (i) replace the interlocking washers by a single washer hinged across a diameter, or (ii) substitute a helical spring washer such that the washer, when compressed, presents an externally facing surface which is substantially unbroken but which in the open state can be inserted through the hole by a screwing action, or (iii) use an elastomeric washer reinforced with wires disposed radially so that the washer can be folded on a diameter for insertion but has sufficient rigidity in the required direction when in use. This latter washer may replace both the interlocking washers and the internal elastomeric washer. Other component designs which can be inserted through the hole in the pipe and liner from the outside, and which are capable of forming a rigid seal with the liner are envisaged.

A leak-free seal is required between the internal surface of the liner and the termination of the lateral connection, since wetting of the textile reinforcement must be avoided. The illustrated arrangement provides such a seal .

We claim:

1. A method of lining an existing pipe with a permanently non-rigid liner comprising: pulling through said pipe a collapsible, flexible, permanently non-rigid, lay-flat tubular liner in a non-inflated condition, said liner having an innermost layer of impervious, elastomeric material which is compatible with the fluid to be carried by the pipe, a textile reinforcing intermediate layer, and an external protective layer of elastomeric material, said liner having an external circumference slightly less than the internal circumference of the pipe and being sufficiently flexible that pressure of said fluid in the liner after the installation thereof expands the liner into non-bonding contact with the internal surface of the pipe the liner remaining permanently capable of resilient contraction on removal of said pressure, whereby the liner remains capable of being withdrawn from the pipe.

2. A method as claimed in claim 1, comprising, for the purpose of installing a branch or service connection to the pipeline, the additional step of maintaining a supply of air or inert gas into the liner under a pressure sufficient to expand the lining into engagement with the internal surface.

3. A method as claimed in claim 2 further comprising the steps of cutting a hole in the liner and, if not already provided, in the pipe at the location of the branch, and inserting into the interior of the liner through the holes a bolt having a through-bore and a shoulder at the internal end of the bolt, placing on the shank of the bolt and manipulating through said hole in the liner washer means having a greater diameter than said hole in the liner and having an internal diameter less than that of the shoulder, placing on the shank of the bolt an external washer the inner face of which engages the liner about the periphery of the hole therein, clamping the liner between said washer means and the external washer, and securing the bolt relative to the pipe.

4. A method as claimed in claim 1, comprising the initial step of selecting the liner such that at the intended working pressure, the diametral swell of the liner shall be less than 10%.

5. A method as claimed in claim 1, comprising the initial step of selecting the liner such that at the intended working pressure, the diametral swell of the liner shall be less than 5%.

6. A method as claimed in claim 1, comprising the further step of causing the liner to project beyond each end of the pipe, disposing about each end part of the liner an internally tapered tubular portion of a connector, the larger internal diameter end of said portion being nearer said end of the liner, inserting smaller end first into the end part of the liner an externally tapered tubular portion of the connector, and moving the two portions axially relative to each other to cause said end part of the liner to be clamped between said two portions of the connector.

7. A method as claimed in claim 1 comprising the step of employing a circular-woven fabric as said reinforcing layer.

8. A method as claimed in claim 1 comprising the step of employing a braided fabric as said reinforcing layer.

9. A method as claimed in claim 1 comprising the step of employing a knitted fabric as said reinforcing layer.

* * * * *